United States Patent [19]

Schumacher et al.

[11] 4,261,832

[45] Apr. 14, 1981

[54] MEMBRANES WITH PRESELECTED PORE TYPES FOR SEPARATION PROCESSES

[75] Inventors: Horst Schumacher; Harald Jüntgen; Ernst Preuss; Dieter Zündorf; Werner Hodek, all of Essen; Ingo Romey, Hünxe, all of Fed. Rep. of Germany

[73] Assignee: Bergwerksverband GmbH, Essen, Fed. Rep. of Germany

[21] Appl. No.: 913,078

[22] Filed: Jun. 6, 1978

Related U.S. Application Data

[63] Continuation-in-part of Ser. No. 801,385, May 27, 1977, abandoned.

[30] Foreign Application Priority Data

Jun. 2, 1976 [DE] Fed. Rep. of Germany ....... 2624639

[51] Int. Cl.³ ............................................. B01D 39/20
[52] U.S. Cl. .................................. 210/500.2; 55/16; 210/502; 210/510; 264/29.7; 264/44
[58] Field of Search ............. 210/500 M, 502, 321 R, 210/510, 496; 521/919; 23/449, 447.7, 447.8; 55/16, 158, 523; 264/44, 29.6, 29.7

[56] References Cited

U.S. PATENT DOCUMENTS

| | | | |
|---|---|---|---|
| 1,988,478 | 1/1935 | Broadwell et al. | 210/510 |
| 3,158,532 | 11/1964 | Pall et al. | 210/321 R |
| 3,351,495 | 11/1967 | Larsen et al. | 210/500 M |
| 3,375,933 | 4/1968 | Rodman | 210/502 |
| 3,814,642 | 6/1974 | Araki et al. | 423/449 X |

*Primary Examiner*—Frank A. Spear, Jr.
*Attorney, Agent, or Firm*—Michael J. Striker

[57] ABSTRACT

A membrane having a preselected pore type which is suited for separating processes comprising a shaped body formed by heating a mixture of finely ground carbonaceous material with a binder composed of about 5 to 20% by weight natural or synthetic elastomer or a mixture of both and of about 1 to 20% by weight of thermoplastic material to about 400° to 1400° C. in an inert atmosphere at a rate of temperature increase between 0.1° and 10° C./min. The membranes are useful for a wide range of selective chemical and physical separation operations of different materials.

11 Claims, No Drawings

MEMBRANES WITH PRESELECTED PORE TYPES FOR SEPARATION PROCESSES

CROSS-REFERENCE TO RELATED APPLICATION

This application is a continuation in part of application Ser. No. 801,385 filed May 27, 1977, now abandoned.

BACKGROUND OF THE INVENTION

The invention relates to membranes having preselected pore types which are made from shaped bodies composed of finely divided carbonaceous materials and binders and wherein the formed bodies are subjected to subsequent heat treatment.

Separating processes employing membranes have obtained great importance in recent processing techniques and have resulted in intensive research activity. Of interest are above all areas where the classic separation methods such as distillation, deep-freeze dissociation and similar processes have failed or are too harsh or too expensive. Thus, membranes have been used for almost 50 years in separating isotopes and during the last few years for obtaining helium from mineral oil and natural gas. Membranes are also used for separation of liquid phases, such as in reverse osmosis, in ultra-filtration and micro-filtration. They are furthermore in use in the nuclear reactor and petroleum industry for the concentration of gaseous materials.

Cellulose-acetate membranes have been used also widely in reverse osmosis processes. They permit molecules with hydrogen bridges, particularly $H_2O$ to pass by their carbonyl groups while other types of molecules are subject to good retention.

From the German published application No. 1,719,557, it has also become known to employ two layer-dry cellulose acetate membranes for gas separation which have a porous and a non-porous layer. With these membranes the gas separation is effected by active diffusion into the non-porous layer while the porous layer only has protective purposes.

The German allowed application No. 2,321,459 also shows acrylonitrile polymer membranes which have a microporous surface to which are added one or several porous layers with increasing pore dimensions. These membranes are particularly intended for ultrafiltration.

From the German allowed application No. 1,925,582, synthetic membranes are also known of polytetrafluoroethylene which likewise are microporous and can be used for gas separation. A separation is, however, possible only if one face of the membrane is contacted with steam.

There are, furthermore, known from the German published application No. 2,055,559, molecular sieves made of thermally degraded polyphenylene oxides. These materials can also be used in the form of foils and have slot-shaped pores.

The problem of the membrane separation processes is that selectivity and permeability are in competition with each other: a high selectivity lowers the permeability and thus requires an increase of the required membrane surface. Besides, it is desirable to use membranes which are as thin as possible since this reduces the resistance towards movement of the process medium. However, this in turn results in a substantial reduction of the mechanical strength of the membrane. Thus, it is continuously necessary to compromise or to resort to expensive auxiliary materials and steps. Besides, the performance of many membranes is still unsatisfactory.

It is therefore the object of the present invention to provide membranes with preselected pore types which have higher permeabilities than the prior art membranes at the same selectivities and may be made to measure for any specific separation problem as it may arise.

This is important for a use of the membranes at reasonable cost where the problem is the separation of gaseous and liquid mixture and where components have to be concentrated which have a great penetration power. Besides, it is an object to provide membranes of high strength which makes it unnecessary to employ special supporting materials.

Particularly it is of interest to have porous membranes of different pore sizes for use by the coke producing and mineral oil industries.

SUMMARY OF THE INVENTION

These problems are met by a membrane having a preselected pore type which is suited for separating processes and is formed by heating a shaped body composed of a mixture of finely ground coal material with a binder composed preferably of (a) between about 5 and 20% by weight of natural or synthetic elastomer or a mixture of both elastomers and (b) about 1 and 20% by weight of thermoplastic material to about 400° to 1400° C. in an inert atmosphere at a rate of heat increase between about 0.1° and 10° C./min. The membranes are useful for a wide range of chemical and physical separation operations between different materials. The invention also comprises a process wherein the said heat treatment is effected in an inert atmosphere at a rate of temperature increase between 0.1° and 10° C./min.

The shaped bodies of the invention may be in the form of tubings, foils or discs with a wall thickness between 0.1 and 5 mm.

The preferred carbonaceous material used as the starting material is for instance mineral coal or lignite or a special coke, including charcoal, peat coke and lignite low temperature coke.

It has been surprising to find that porous membranes of different pore sizes could be formed by many different material combinations composed of mixtures of finely ground coal or coke, elastomers and thermoplastic materials if the compositions had the appropriate amounts of each components for the specific size and if the membranes were subjected to the corresponding proper thermal treatment. Some of these membranes are comparatively expensive. This, however, is no obstacle for their use for special purposes.

The membranes of the invention have a distribution of pore radii of a specific amplitude, a specific total pore volume and a specific size of the mean pore radii, all of which is determined by the type of mixture and heat treatment. Thus, it is possible for each specific separation problem to have a suitable pore type which also provides a high permeability.

In order to vary the pore size of the products of the invention the mean macropore radii can be increased among others by increasing proportions of thermoplastic materials and can be decreased by increasingly fine grinding of the carbonaceous starting product. The permeability and pore size is furthermore affected by the proportion of components particularly the amount of binder, and the degree of grinding and also by the type of heat treatment. Among others, increasing rates of temperature rise increase the permeability and pore size.

On the other hand, the smaller the grain size of the coal, the smaller are the macropores. Still more effectively is the pore size furthermore determined by the ratio of coal and binder and different types of binder.

The membranes of the invention, particularly when made in the form of tubes or tubings, have a high strength to an extent that even at low wall thicknesses, even below 1 mm, they can withstand differential pressures of more than 1500 psi without supporting materials.

A further advantage of these membranes is the high degree of homogeneity and facility of reproduction of the pore distribution. This could be determined by measurement of the permeation and pore structure of membranes produced in identical manner. It is all of these points where the prior art membranes usually had shortcomings.

DISCUSSION OF THE INVENTION AND PREFERRED EMBODIMENTS

The permeability is usually given as volumes (under standard conditions) per unit of time, surface and pressure difference times the thickness of the membrane, and is expressed in the following manner:

$m^3 \cdot mm \cdot sec^{-1} \cdot m^{-2} \cdot bar^{-1}$ (gas or liquid).

Since different amounts of materials penetrate a membrane in case of different gases or liquids under identical conditions and since this results in a higher concentration of the more easily penetrating components, it is customary to designate the ratio of permeabilities of the corresponding components as the optimum separation factor. A measure for the selectivity thus is expressed as follows:

$P_A/P_B = a$ (A is the component which penetrates more easily).

The permeabilities for gaseous hydrogen which, in most cases, is the component of easiest penetration through a membrane, are for the more recently described synthetic membranes between $10^{-6}$ and $10^{-8} m^3 \cdot mm \cdot sec^{-1} \cdot m^{-2} \cdot bar^{-1}$.

This is for instance described in the German published application No. 17 19 557.

The optimum separation factors as against other gases are between 1.5 and 70, it being borne in mind that usually high separation factors coincide with the lowest permeabilities.

As distinguished, the lowest hydrogen permeability which was found in the membranes of the invention was $0.7 \cdot 10^{-3} m^3 \cdot mm \cdot sec^{-1} \cdot m^{-2} \cdot bar^{-1}$.

The optimum separation factor as against methane is 3.0 and against carbon dioxide 4.8.

A similar situation exists for the membranes when used for ultrafiltration of liquids (of particle sizes between $10^{-2}$ and $10^{-1}$ microns). In this case the $H_2O$ permeabilities of the prior art membranes are between $10^{-6}$ and $10^{-7} m^3 \cdot mm \cdot sec^{-1} \cdot m^{-2} \cdot bar^{-1}$.

This must be compared with the membranes of the invention in which the mean macropore radius is $2 \cdot 10^{-1}$ micron = $2 \cdot 10^3$ angstrom units and of which the hydrogen gas permeability if $5 \cdot 10^{-3} m^3 \cdot mm \cdot sec^{-1} \cdot m^{-2} \cdot bar^{-1}$ while the water permeability was established as $1.2 \cdot 10^{-5} m^3 \cdot mm \cdot sec^{-1} \cdot m^{-2} \cdot bar^{-1}$.

The following examples will further illustrate the invention:

EXAMPLE 1

80 parts by weight of finely ground mineral coal of which 98% of the particles had a particle size of $<10\mu$ and 50% $3.5\mu$, were mixed with 1.5 parts by weight of a butadiene acrylonitrile mixed polymerizate in latex form and 5 parts by weight of polyethylene in pulverulent form and the mixture shaped on an extruder to a tubing having an 0.5 mm wall thickness. The tubing was then heated in a shaft furnace in a nitrogen atmosphere up to a temperature of 750° C. at a rate of temperature increase of 2° C./min.

The mean macropore diameter of the final membrane was $5 \times 10^2$ angstrom units. The permeability for hydrogen at 20° C. and 1 bar was $2.1 \cdot 10^{-3} m^3 \cdot mm \cdot sec^{-1} \cdot m^{-2} \cdot bar^{-1}$ (gas).

The optimum separation factor against methane was 3.

EXAMPLES 2 to 8

The following table summarizes the Examples 2 to 8. In all these cases, the tubings were made as described in Example 1. In the table there are set out also the mean macropore diameters and the permeability.

The coal grain size in the examples 2 to 7 was more or less uniform as between the different Examples. The size distribution was about as follows:

80%: 63$\mu$
50%: 23$\mu$
30%: 10$\mu$
and

The coal grain size of Example 8 was as in Example 1.

The examples show that with the invention it is possible to select highly varied pore types with comparatively high permeabilities for different membrane separation purposes.

| Example No. | mixture ground coal | elastomer | thermo-plastic material | wall thickness | rate of temperature increase °C./min Final temperature °C. | mean macropore radius (angstrom units) | coefficient of permeation $10^{-3} m^3 \cdot mm \cdot sec^{-1} \cdot m^{-2} \cdot bar^{-1}$ at atmospheric pressure $H_2$ | $CO_2$ | $H_2O$ |
|---|---|---|---|---|---|---|---|---|---|
| 2 | 80% mineral coal coke | 10% butadiene-acrylonitrile mixed polymerizate | 10% high pressure poly- | 2 | $\frac{5}{750}$ | $5 \times 10^3$ | 39.2 | 14.1 | — |
| 3 | 80% lignite coal | 15% polyiso-butylene | 5% poly-vinyl-alcohol | 2 | $\frac{6}{900}$ | $3 \times 10^4$ | 364.0 | — | — |
| 4 | 85% peat coke | 10% butadiene-acrylonitrile mixed polymerizate | 5% low pressure poly-ethylene | 3 | $\frac{0.5}{1100}$ | $2.5 \times 10^3$ | 7.8 | — | — |
| 5 | 75% charcoal | 20% butadiene-acrylonitrile mixed polymerizate | 5% low pressure poly-ethylene | 4 | $\frac{1}{800}$ | $1 \times 10^4$ | 60.0 | — | — |
| 6 | 85% mineral coke | 10% polyiso-butylene | 5% high pressure poly-ethylene | 2 | $\frac{2}{700}$ | $2 \times 10^3$ | — | — | 0.01 |
| 7 | 87.5% hard coal coke | 10% butadiene-acrylonitrile mixed polymerizate | 2.5% high pressure polyethy-lene | 2 | $\frac{0.5}{750}$ | $9 \times 10^2$ | 0.7 | — | — |
| 8 | 78.75% hard coal coke (grain size see Ex. 1) | 20% butadiene-acrylonitrile mixed polymerizate | 1.25% high pressure polyethyl-ene | 2 | $\frac{0.1}{750}$ | $2 \times 10^2$ | not determined | — | — |

Without further analysis, the foregoing will so fully reveal the gist of the present invention that others can, by applying current knowledge, readily adapt it for various applications without omitting features that, from the standpoint or prior art, fairly constitute essential characteristics of the generic or specific aspects of this invention.

What is claimed as new and desired to be protected by Letters Patent is set forth in the appended claims:

1. A membrane adapted for use in selective separation processes and having a predetermined pore size consisting essentially of a finely divided coke-like frame-work and having been formed by heating a shaped body composed of a mixture of
    (a) a finely ground carbonaceous material,
    (b) about 5–20% by weight of at least one member selected from the group consisting of natural and synthetic elastomers, and
    (c) about 1–20% by weight of a thermoplastic material to a temperature of about 400° to 1400° C. in an inert atmosphere at a rate of temperature increase of between 0.1° and 10° C. per minute.

2. A membrane according to claim 1 wherein said carbonaceous material is selected from the group consisting of mineral coal, lignite, charcoal, peat coke and lignite low temperature coke.

3. A membrane according to claim 1 in the form of a pressure-made tube, tubing, foil or disc having wall thickness of between 0.1 and 5 mm.

4. A membrane according to claim 1 which resists pressure in excess of 10 bar at a wall thickness below 1 mm and in the absence of any external supporting material.

5. A membrane according to claim 1 wherein the elastomer is member selected from the group consisting of a butadiene-acrylonitrile mixed polymerizate and polyisobutylene.

6. A membrane according to claim 1 wherein the thermoplastic material is a member selected from the group consisting of high pressure polyethylene, low pressure polyethylene and polyvinyl alcohol.

7. The process of making a membrane according to claim 1 comprising mixing
    (a) a finely ground carbonaceous material,
    (b) about 5–20% by weight of at least one member selected from the group consisting of natural and synthetic elastomers, and
    (c) about 1–20% by weight of a thermoplastic material, subjecting the resultant mixture to shaping, and thereafter subjecting the shaped mixture to heating at a temperature of 400° to 1400° C. in an inert atmosphere at a rate of temperature increase of between 0.1° and 10° C./min.

8. The process of claim 7 wherein the elastomer is a member selected from the group consisting of a butadiene-acrylonitrile mixed polymerizate and polyisobutylene.

9. The process of claim 7 wherein the thermoplastic material is a member selected from the group consisting of high pressure polyethylene, low pressure polyethylene and polyvinyl alcohol.

10. The process of claim 7 wherein the shaping is effected under pressure sufficient to provide a wall thickness of 0.1 to 5 mm.

11. The process of claim 7 wherein said mixture comprises 70 to 90 parts by weight of an elastomer and 1 to 20 parts by weight of a thermoplastic material as binder.

* * * * *